United States Patent

[11] 3,628,835

[72] Inventors Robert Franklin Cornish
 722 Edgewood St. S.E., North Canton,
 Ohio 44720;
 Robert Lee Leibensperger, 4731 Woodside
 Ave. N.W., Canton, Ohio 44709
[21] Appl. No. 78,078
[22] Filed Oct. 5, 1970
[45] Patented Dec. 21, 1971

[54] HIGH-SPEED TAPERED ROLLER BEARING
 17 Claims, 9 Drawing Figs.
[52] U.S. Cl. ................................................. 308/187,
 308/214
[51] Int. Cl. ........................................... F16c 33/66,
 F16c 19/14
[50] Field of Search ............................................ 308/187,
 212, 213, 214

[56] References Cited
 UNITED STATES PATENTS
 3,301,615 1/1967 Brady ........................... 308/187

Primary Examiner—Martin P. Schwadron
Assistant Examiner—Frank Susko
Attorney—Gravely, Lieder & Woodruff ABSTRACT: A tapered roller bearing has an annular lubricant collector trough connected to the small diameter end of the cage in which the tapered rollers are contained. The open side of the trough is presented toward the axes of rotation, while the opposite side communicates with the inner ends of distribution tubes which extend between adjacent rollers. The opposite or outer ends of the distribution tubes are directed toward the cone thrust rib against which the large diameter ends of the rollers bear for axially positioning the rollers. When a lubricating oil is introduced into the open side of the collector trough, the lubricant is scooped up and forced to flow into the distribution tubes and from there the lubricating medium issues from the outer ends of the tubes and flows against the cone thrust rib, thereby lubricating this critical surface even during extremely high-speed operation.

INVENTORS:
ROBERT F. CORNISH
ROBERT L. LEIBENSPERGER
BY Gravely, Lieder & Woodruff
ATTORNEYS.

INVENTORS:
ROBERT F. CORNISH
ROBERT L. LEIBENSPERGER
BY Gravely, Lieder & Woodruff
ATTORNEYS.

INVENTORS:
ROBERT F. CORNISH
ROBERT L. LEIBENSPERGER
BY Gravely, Lieder & Woodruff
ATTORNEYS.

HIGH-SPEED TAPERED ROLLER BEARING

BACKGROUND OF THE INVENTION

This invention relates to bearings and more particularly to a tapered roller bearing having lubricating means which enables the bearing to operate at extremely high speeds.

Conventional tapered roller bearings comprise four basic parts, namely a cone, a cup, tapered rollers, and a cage. The cup surrounds the cone and the two have opposing raceways along and between which the tapered rollers roll. The cage maintains the proper spacing between the rollers and further prevents them from leaving the cone when the cone is withdrawn from the cup. To maintain the rollers in the proper axial position between the raceways of the cup and cone, the cone at the large diameter end of its raceway is provided with a thrust rib against which the circular end faces of the rollers bear.

Providing lubrication to the thrust rib at low bearing speeds presents no problem since a lubricant introduced anywhere into the bearing will find its way to the thrust rib due to the churning action of the rollers. At high bearing speeds, however, the lubricating oil is subjected to centrifugal forces of considerable magnitude and these forces tend to direct the oil outwardly away from the thrust rib. Thus, at high speeds the inside face of the cone thrust rib and the abutting circular end faces on the rollers become starved for lubrication, and the bearing in time fails.

Heretofore attempts have been made to alleviate the foregoing problem, but these attempts have met with only limited success. For example, bearings have been constructed with oil jets directed at the roller end faces which run against the thrust rib. This arrangement proved unsatisfactory since the windage created by the cone, rollers and cage during high speed operation diverts the oil issuing from the jets away from the critical contact areas. Another concept which has also proved unsatisfactory involves installing a curved oil dam on the cup. This dam extends inwardly across the ends of the rollers and reverses the flow of oil through the bearing so that the oil is directed inwardly toward the roller end faces. The damming effect and the reversal of direction generates considerable heat in the oil, and this in turn causes excessive heat in the bearing system.

SUMMARY OF THE INVENTION

One of the principal objects of the present invention is to provide a tapered roller bearing which can operate at extremely high speeds. Another object is to provide a roller bearing having means for supplying lubrication to critical bearing surfaces during high speed operation. A further object is to provide a bearing of the type stated in which churning of the lubricating medium is minimal so that relatively little heat is generated. An additional object is to provide a bearing of the type stated in which the centrifugal forces set up in the lubricating medium are employed to distribute the lubricating medium to critical bearing surfaces. Still another object is to provide a bearing of the type stated which is simple in construction and economical to manufacture. These and other objects and advantages will become apparent hereinafter.

The present invention is embodied in a roller bearing having two members provided with opposed raceways. Rollers fit between the raceways and engage the raceways and their end faces bear against a rib adjoining one of the raceways. Means are provided for directing a lubricant at the rib, and the means employ centrifugal force to effect the distribution.

DESCRIPTION OF THE DRAWINGS

In the accompanying drawings which form part of the specification and wherein like numerals and letters refer to like parts wherever they occur.

DETAILED DESCRIPTION

Figure 1:
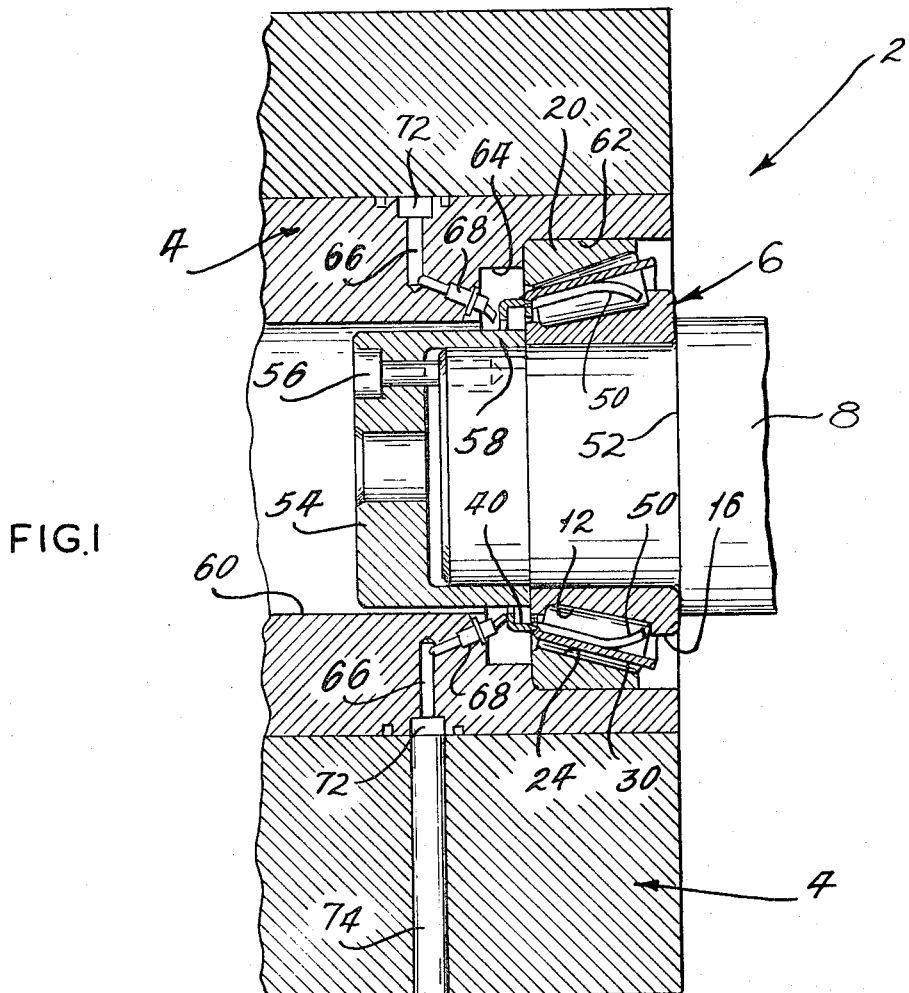
FIG. 1 is a sectional view of a shaft journaled in a housing by a high speed bearing constructed in accordance with and embodying the present invention.

Referring now to the drawings, 2 designates a journal construction which broadly speaking includes (FIG. 1) a housing 4, a tapered roller bearing 6, and shaft 8. The shaft 8 rotates at high speeds and is journaled in the housing 4 by means of the bearing 6.

Turning now to the tapered roller bearing 6, it includes a cone 10 which receives he shaft 8 and on its outwardly presented side is provided with a tapered raceway 12. At the small diameter end of the raceway 12 (FIG. 2), the cone 10 is further provided with retaining rib 14 which projects radially outwardly a short distance beyond the adjoining end of the raceway 12. Similarly, at the large diameter end of the raceway 12, the cone 10 is provided with a radially projecting thrust rib 16 having an inside face 18 presented substantially perpendicular to the raceway 12.

In addition to the cone 10, the bearing 6 further includes a cup 20 which is fitted into the housing 4. The cup 20 has a tapered raceway 24 (FIG. 2) presented opposite to and encircling the raceway 12 of the cone 10. Fitted between the two raceways 12 and 24 and also forming part of the bearing 6 are a plurality of tapered rollers 26 having frustoconical side faces which roll along the raceways 12 and 24 and a large diameter end face 28 which bears against the inside face 18 of the cone thrust rib 16. Thus, the thrust rib 16 axially positions the rollers 26 between the raceways 12 and 24. While each roller 26 appears squared off at its large diameter end face 28, in actual practice the portions thereof which engage the inside rib face 18 form a segment of a large sphere.

Finally, the bearing 6 also includes a cage 30 (FIG. 3) consisting of a pair of annular bands 32 and 34 which are connected by axially extending bridges 36 so as to from a plurality of circumferentially spaced roller apertures 38. In actual practice the cage 30 is a stamping in which the bridges 36 are formed integral with the bands 32 and 34. The length of each aperture 38 is slightly greater than the axial dimension for the rollers 26, whereas the width is slightly less than the diameter of the rollers 26. This enables the rollers 26 to extend partially through the apertures 38, from the inside and beyond the outer surfaces of the cage 30, but prevents the rollers from falling completely through the apertures 38. Moreover, the side margins of the bridges 36 are chamfered so that they generally follow the curvature of the frustoconical roller surfaces located adjacent to them. The cage 30 fits around the cone 10 such that the rollers 26 project through the roller apertures 38 therein. Since the apertures 38 are narrower than the rollers 26, the cage prevents the rollers 26 from departing the cone raceway 12 in a radial direction when the cone 10 is removed from he cup 20. The bridges 36 furthermore serve as spacers between adjacent rollers 26 and prevent such rollers 26 from contacting each other. Indeed, the bridges 36 maintain the correct circumferential spacing between the rollers 26. The thrust rib 14 and retaining rib 16 prevent the rollers 26 from sliding axially off of the cone 10 when the cone 10 is removed from the cup 20.

Figure 4:
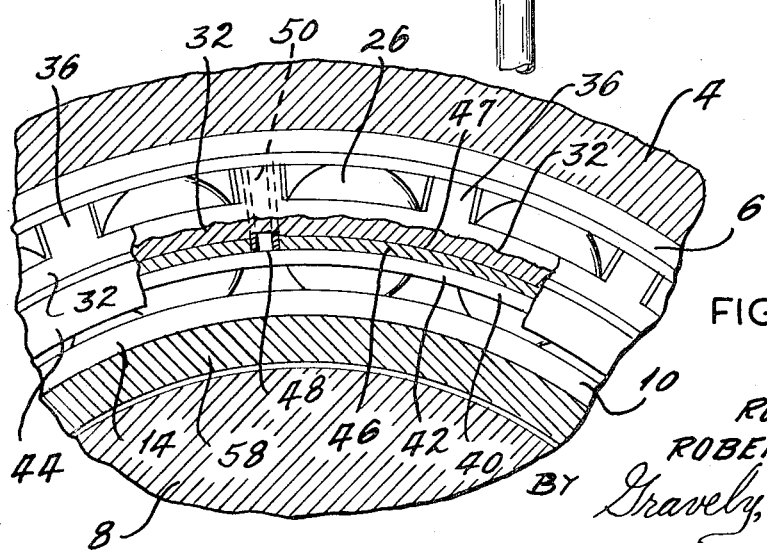
FIG. 4 is a fragmentary sectional view taken along line 4—4 of FIG. 2 and partially broken away.

The cage 30 carries means for distributing a lubricating oil to the inside face 18 of the thrust rib 16 even during extremely high speed operation of the bearing 6. In particular, the side of he small diameter cage band 32 is turned inwardly so that its edge is parallel to the shaft 8. Fitted against that edge is a collector annulus or trough 40 (FIGS. 2–4) including a pair of spaced sidewalls 42 and 44 and a connecting wall 46 between them. The connecting wall 46 (FIG. 2) is formed integral with the sidewalls 42 and 44 and closes the outer end of the trough 40 formed thereby. Beyond the inner sidewall 42 the connecting wall 46 is provided with a reduced cylindrical surface 47 which fits snugly into the ring formed by the turned down edge of the small diameter cage band 32. The connecting wall 46 is soldered or otherwise secured to the cage band 32, and when the trough 40 is so connected with cage 30 the sidewall 42 is disposed generally about the retaining rib 14 but is spaced slightly outwardly therefrom, while the sidewall 44 is spaced axially from the rib 14. Accordingly, the collector trough 40 in part projects axially beyond the cone 10.

Figure 2:
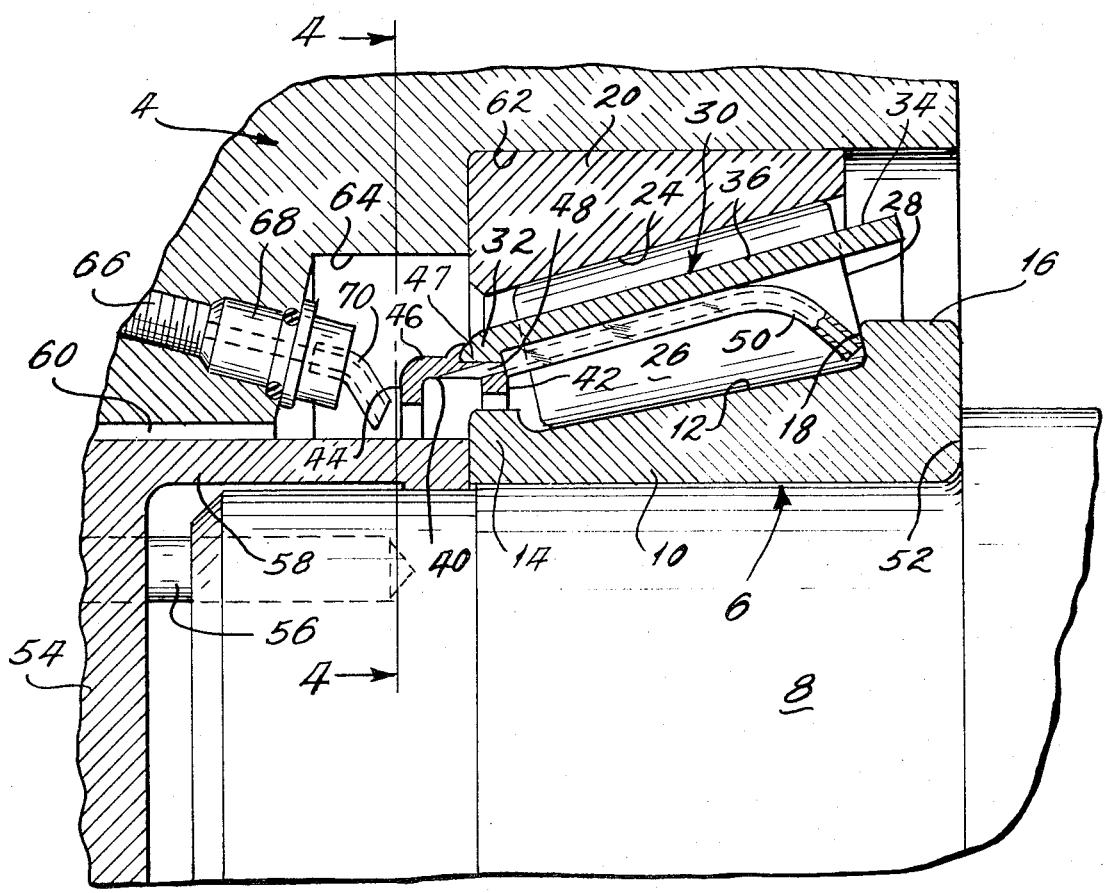
FIG. 2 is an enlarged fragmentary sectional view of the bearing illustrated in FIG. 1.
Figure 3:
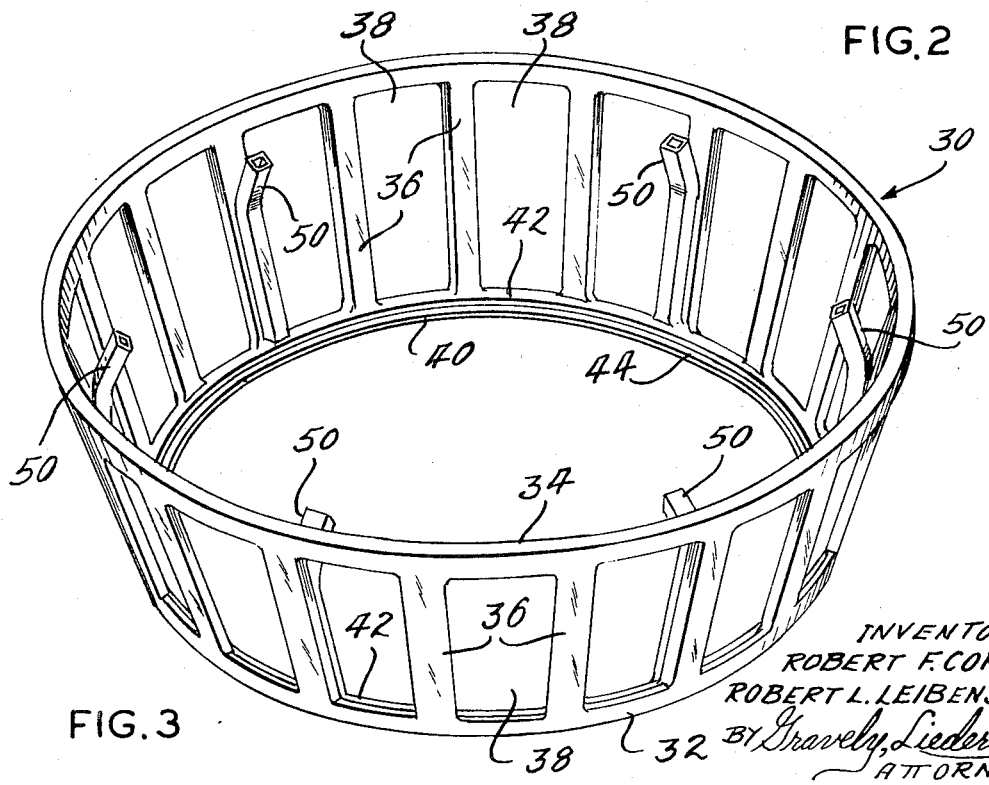
FIG. 3 is a perspective view of a cage forming part of the present invention.

The sidewall 42 of the trough 40 adjacent to the ends of several of the cage bridges 36 is provided with apertures 48 (FIGS. 2 and 4) which open into distribution channels or tubes 50 (FIGS. 2 and 3). The ends of the distribution tubes 50 are soldered to the sidewall 42 around the apertures 48 so that no leakage occurs at the juncture of the tubes 50 and collector trough 40. The tubes 50 extend along and for a major portion of their length are soldered against the bridges 36, but near their opposite ends they turn inwardly. The tubes 50 terminate adjacent to the juncture of the cone raceway 12 and the inside face 18 on the thrust rib 16 (FIG. 2). Thus, the distribution tubes 50 are located between adjacent rollers 26 around the cage 30. Moreover, the terminal ends of the distribution tubes 50 are located further from the axis of rotation of the cone 10 than are the inner edges of the sidewalls 42 and 44.

The shaft 8 over which the cone 10 of the bearing 6 fits is provided with a shoulder 52 against which the large diameter end of the cone 10 abuts. At the opposite end of the bearing 6 an end cap 54 (FIG. 1) is fastened to the shaft 8 by means of cap screws 56, and that end cap has a thin cylindrical skirt or sleeve 58 which extends over the cylindrical end of the shaft projecting beyond the bearing 6. The end of the skirt 58 bears against the cone 10 so as to urge the cone 10 against the shoulder 52. Accordingly, the cone 10 is confined on the shaft 8 between the skirt 58 and the shoulder 52. The inwardly presented margin of the sidewall 44 on the collector trough 40 is spaced outwardly from the outer surface of the skirt 58 so that a clearance exists between the two.

The housing 4 includes a bore 60 into which the end of the axle 8 extends and a counterbore 62 into which the cup 20 is press-fitted. Beyond the counterbore 62 the housing 4 has another but smaller counterbore 64 which forms a relief beyond the bearing 6 for accommodating the collector trough 40. Leading to counterbore 64 are lubricant passageways 66 having bushinglike oil jets 68 threaded into their inner ends. Each oil jet 68 has a nozzle 70 which is directed downwardly toward the portion of the end cap skirt 58 surrounded by the collector trough 40. Indeed, the nozzles 70 terminate in close proximity to the inner margin of the sidewall 44, so that oil issuing from the nozzles 70 will flow into the open end of the trough 40. The passageways 66 at their outer ends open into an annular feed channel 72 which is supplied with oil through single inlet duct 74.

Beyond the shoulder 52 the shaft 8 may be provided with a suitable seal. After the oil leaves the vicinity of the bearing 6 it is recirculated through the duct 74, channel 72, and passageways 66.

In operation, the shaft 8 rotates in the housing 4, the journal being provided by the bearing 6. The cup 20, of course, remains stationary while the cone 10 rotates with the shaft 8. The rollers 26 roll along the raceways 12 and 24, and in so doing carry the cage 30 along with them. Consequently, the cage 30 also revolves within the cup 20, but at a slower speed than the cone 10. Only a minimal amount of friction develops along the raceways 12 and 24 since the contact between the rollers 26 and the raceways 12 and 24 is purely rolling in nature. However, the situation is quite different where the large diameter end faces 28 of the rollers 26 bear against the inside face 18 of the thrust rib 16. Here the contact is a sliding or wiping one.

In a conventional tapered roller bearing operating at low or moderate speeds normally a thin film of lubricant is maintained between inside rib face and roller end faces so that friction is not enough to damage the bearing. The lubricant within the bearing finds its way to the inside rib face due to the churning action of the rollers on it, notwithstanding the centrifugal forces acting on the lubricant. At high speeds the centrifugal force increases substantially, and this force overcomes he churning action and flings the lubricant outwardly. As a result the inside rib face and roller end faces become starved for lubricant. Consequently, welding occurs between those engaged faces, and this eventually destroys the bearing.

In the bearing 6, lubricating oil is forced under pressure through the supply passages 66 to the oil jets 68, where it issues from the nozzles 70 thereof as a narrow and confined stream. This stream remains intact through the gap between the sidewall 44 of the collector trough 40 and the revolving skirt 58 on the end cap 54. Directly inwardly from the collector trough 40 the rotating skirt 58 and the windage from the rotating bearing components breaks up the stream and causes the oil to flow in a circular path. The centrifugal forces resulting from this change in direction drive the oil outwardly into the confines of the trough 40, and further cause it to flow through the apertures 48 and into the distribution tubes 50. Since the discharge ends of the tubes 50 are located further outwardly in the bearing 6 than the inner margins of either of the sidewalls 42 or 44 on the collector trough 40, the oil discharges from the tubes 50 and flows against inside face 18 on the thrust rib 16. This, of course, eliminates excessive friction as the large diameter end faces 28 on the rollers 26 wipe along the inside rib face 18. Inasmuch as the centrifugal forces in the bearing 26 increases in proportion to the square of the angular velocity, the oil flow through the collector trough 40 and distribution tubes 50 increases as the shaft speed increases. Thus, the collector trough 40 and tubes 50 supply oil to the inside rib face 18 and roller end faces 28, even during extremely high speed operation of the bearing 6.

Moreover, at high speeds most of the lubricating oil is diverted past the rollers 26 to the critical surfaces 18 and 28 and consequently is not subjected to significant churning by the rollers 26. This keeps the temperature of the bearing low and avoids wasting energy delivered to the shaft 8.

A limited amount of oil, however, does find its way to the raceways 12 and 24 so that they receive adequate, but not excessive lubrication.

After flowing across the rib face 18, the oil leaves the bearing 26, is collected, and thereafter is recirculated by means of a pump (not shown) through the supply passages 66.

Figures 5, 6:
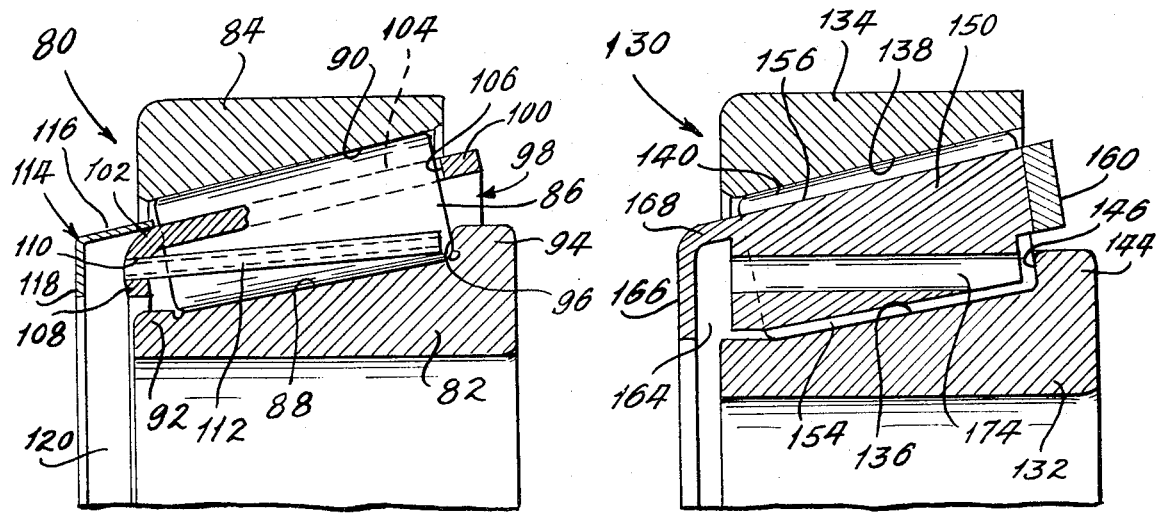
FIG. 5 is a fragmentary sectional view of a modified high speed bearing.
FIG. 6 is a fragmentary sectional view of another modified high speed bearing, the view being taken between adjacent rollers.

It is possible to provide the journal construction 2 with a modified bearing 80 (FIG. 5) which is very similar to the bearing 6. Like the bearing 6, the bearing 80 includes a cone 82 which fits over the shaft 8, a cup 84 which fits into the housing counterbore 62, and a plurality of tapered rollers 86 which engage and roll along opposed tapered raceways 88 and 90 on the cone 82 and cup 84, respectively. The cone 82, furthermore, has a retaining rib 92 and thrust rib 94 projecting respectively beyond the small and large diameter ends of the cone raceway 88. The thrust rib 94 is provided with an inside face 96 along which the large diameter ends of the rollers 86 pass.

The bearing 80 also has a cage 98 for maintaining the correct circumferential spacing between the rollers 86, and for preventing the rollers 86 from departing the cone 82 when the cone 82 and rollers 86 are withdrawn from the cup 84. The cage 98 includes large and small annular bands 100 and 102 held together by axially extending bridge pieces 104. The large band 100 encircles the thrust rib 94 and extends across the large diameter end faces of the rollers 86, while the small band 102 encircles the retaining rib 92 and extends across the small diameter ends of the rollers 86. The bridge pieces 104 extend between adjacent rollers 86 and together with the annular bands 100 and 102 form roller apertures 106 in the cage 98. The sides of the bridges 104 are champhered so as to conform to the contour of rollers 86. Along its end the small annular band 102 is provided with an inwardly turned flange 108 which projects radially toward the retaining rib 92 and is provided with a plurality of apertures 110 located beyond the ends of several of the bridges 104. The bands 100 and 102, the bridges 104, and the flange 108 are all formed as an integral unit and preferably constitute a metal stamping.

Fitted into the apertures 110 are distribution tubes 112 which extend axially through bearing 80 and terminate adjacent to the inside face 96 of the thrust rib 94. The tubes 112 are soldered to the cage flange 108 at the apertures 110, and beyond the flange 108 they extend between adjacent rollers 86 in inwardly spaced relation from the bridge pieces 104 which separate those rollers 86. Thus, the distribution tubes 112 are, in effect, cantilevered from the flange 108.

The small band 102 furthermore supports an oil annulus 114 having a tapered outer wall 116 which is soldered to the outside face of the small band 102 and an end all 118 which turns inwardly from the outer wall 116 and is located generally parallel to, but is spaced axially from, the flange 108. The end wall 118 and the flange 108 form the sides of an annular collector trough 120, the base or outer end of which is closed by the outer wall 116. Thus, the trough 120 rotates with the cage 98 and opens toward the axis of rotation for the bearing 80. In this connection, it should be noted that the inner edges of both the end wall 118 and the flange 108 are located closer to the axis of rotation for the bearing 80 than are the ends of the distribution tubes 112.

In operation, oil is supplied to the collector trough 120 by the oil jets 68. Upon entering the trough 120, the angular velocity of the cage 98 is imparted to the oil and this causes the oil to flow outwardly in the trough 120 and into the distribution tubes 112 projecting from the flange 108. The tubes 112, of course, convey the oil to the inside face 96 of the thrust rib 94. Accordingly, a thin film of lubricant always exists between inside face 96 and the large diameter end faces of the tapered rollers 86, and this is true even during extremely high speed operation of the bearings 80.

Figures 7, 9:
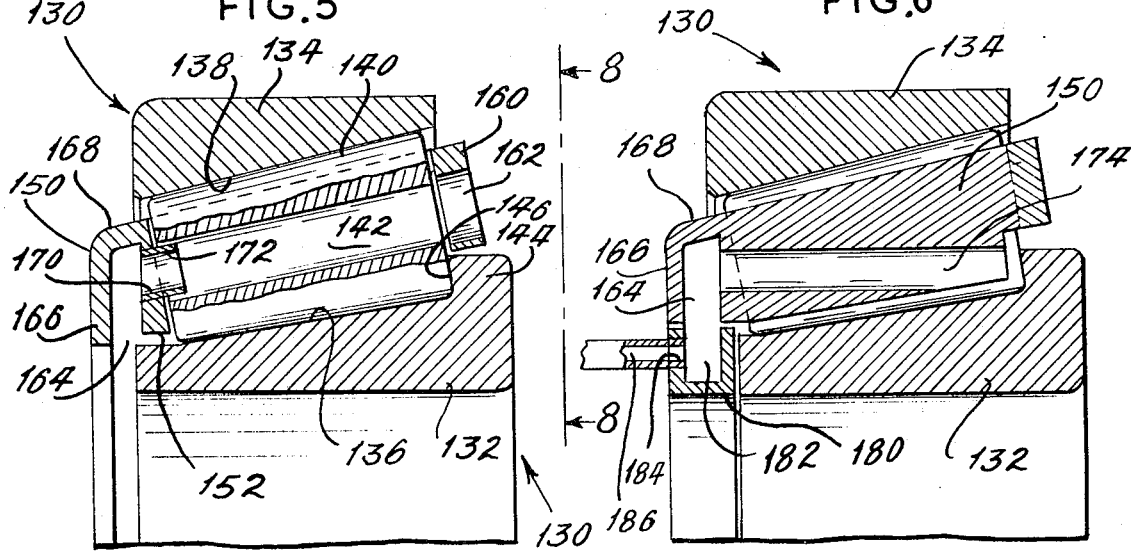
FIG. 7 is a fragmentary sectional view of the same bearing illustrated in FIG. 6, but is taken through one of the rollers.
FIG. 9 is a fragmentary sectional view similar to FIG. 6 and showing the bearing of FIG. 6 provided with an oil supply ring which also forms part of the present invention.
Figure 8:
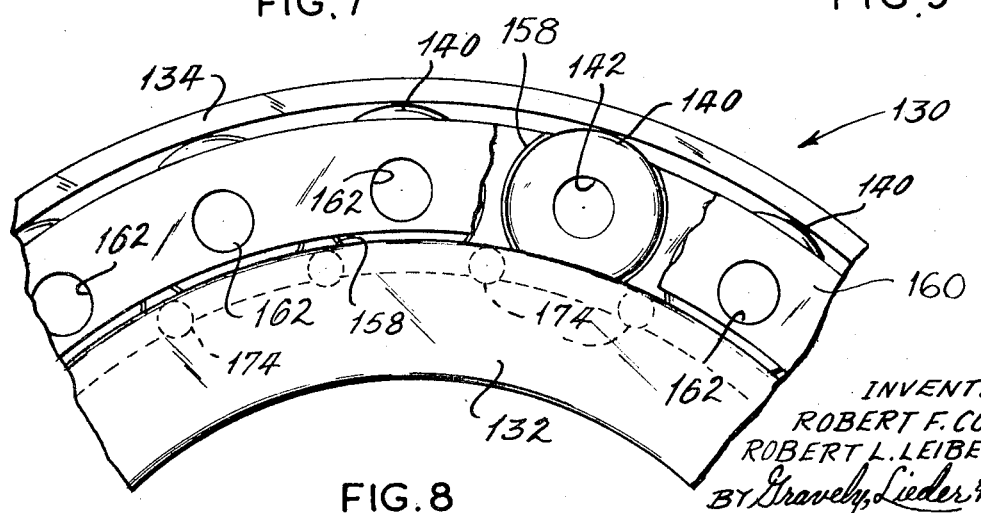
FIG. 8 is a fragmentary end view taken along line 8—8 of FIG. 7.

It is possible to provide the journal construction 2 with still another modified bearing 130 (FIGS. 6–8) which is similar to the bearings 6 and 80. The bearing 130 likewise includes a cone 132 and a cup 134 provided respectively with opposed raceways 136 and 138. Positioned between and engaged with the raceways 136 and 138 are tapered rollers 140 having axial center bores 142 extending completely through them. At the large diameter end of its raceway 136, the cone 132 is provided with a thrust rib 144 having an inside face 146 along which the large diameter end faces of the rollers 140 pass.

To maintain the correct spacing between the rollers 140 and to prevent them from scattering when the bearing 130 is disassembled, a cage 150 is fitted between the cup 134 and cone 136. The cage 150 is preferably cast from a relatively soft metal such as bronze and is provided with tapered inside and outside surfaces 154 and 156, the tapers of which correspond respectively to the tapers of the cone raceway 136 and the cup raceway 138. Moreover, the inside surface 154 is slightly larger than and hence spaced slightly outwardly from the cone raceway 136, while the outside surface 156 is slightly smaller than and spaced inwardly from the cup raceway 138. The cage 150 is further provided with a series of circumferentially spaced pockets 158 sized to receive the tapered rollers 140. These pockets 158 possess arcuate walls which conform to the curvature and taper of the rollers 140. The pockets 158, however, open outwardly through the tapered surfaces 154 and 156 to enable the frustoconical surfaces of the tapered rollers 140 to project both inwardly and outwardly beyond the cage 150 for engagement with the raceways 136 and 138. The tapered pockets 158 are furthermore slightly longer than the rollers 140 so that the rollers 140 fit completely into them, and they open outwardly of the main body of the cage 150 at their large diameter ends so that the rollers 140 can be inserted axially into them.

The large diameter ends of the pockets 158 are partially covered by a retainer ring 160 which is brazed, soldered, or otherwise secured to the main body of the cage 150 to prevent the rollers 140 from leaving the cage 150 and likewise to prevent the cage 150 from shifting axially relative to the rollers 140. The retainer ring 160 has discharge apertures 162 which are centered on the pockets 158 and align with the center bores 142 extending through tapered rollers 140. The retainer ring 160 encircles the thrust rib 144.

At the opposite end the cage 150 is provided with an inwardly opening collector trough 164, defined on its one side by the end face on the main body of the cage 150 and on its opposite side by an end wall 166 which is spaced from and generally parallel to that end face. The end wall 166 at its outer end merges into a connecting wall 168 which in turn merges into the main body of the cage 150 adjacent to the tapered outside surface 156. The walls 166 and 168 are preferably formed integral with the main body of the cage 150, in which case the trough 164 could easily be formed by a simple milling operation. In any event, the innermost margins of the trough 164, that is the inner edge of the end wall 166 and the corresponding end of the inside surface 154 are located closer to the axis of rotation for the bearing 130 than is the juncture of the cone raceway 136 and the inside face 146 of the thrust rib 144.

At the small diameter ends of the tapered pockets 158 the cage 150 is provided with circular apertures 170 which extend between the pockets 158 and the trough 164, and fitted into these apertures 170 are short oil tubes 172 which project into the center bores 142 of the hollow rollers 140.

Between selected tapered pockets 158 the cage 150 is further provided with distribution holes 174, each of which at one end opens into the collector trough 164 and at its opposite end opens outwardly of the cage 150 adjacent to the juncture of the cone raceway 136 and the inside face 146 of the thrust rib 144.

In operation, oil is directed into the collector trough 164 by the oil jets 68, and this oil is accelerated to approximately the angular velocity of the rotating cage 150. Due to the centrifugal force generated by the circular movement of the oil, the oil moves outwardly in the collector trough 164 and is discharged from that trough through the oil tubes 172 and the distributor holes 174. The oil which enters the distributor holes 174 discharges against the inside face 146 of the thrust rib 144 and accordingly provides a thin film of lubricant between that face and the large diameter end faces of the tapered rollers 140. This, of course, enables the bearing 130 to operate at extremely high speeds. The oil discharged through the oil tubes 172 flows through the center bores 142 of the tapered rollers 140 and dissipates heat from those rollers. Accordingly, even during extremely high speed operation the rollers 140 as well as the entire bearing 130 are maintained at relatively low temperatures.

While the oil jets 68 are suitable for supplying oil to the collector trough 164, oil may be supplied to that trough or for that matter the collector troughs 40 and 120 also, by a stationary supply ring 180 (FIG. 9) which encircles the shaft 8 immediately beyond the small diameter end of the cone 132. The supply ring 180 is provided with an outwardly opening groove 182 which aligns with and is disposed directly inwardly from the open end of the collector trough 164. The ring 180 is further provided with apertures 184 in its sidewall located furthest from the end of the cone 132, and anchored in these apertures 184 are oil supply tubes 184 for conveying oil to the groove 182. Indeed, the tubes 186 support the ring 180 in the proper position relative to the cage 150, cone 132 and shaft 8.

Lubricating oil is forced under pressure through the oil supply tubes 186 and into the groove 182. After entering the groove 182 the oil flows directly outwardly and into the collector trough 164 where it is directed through the bearing 130 as previously described.

Of course, the supply ring 180 can be used with either of the bearings 6 or 80 also, in which case its groove 182 would open into the collector troughs 40 or 120.

This invention is intended to cover all changes and modifications of the example of the invention herein chosen for purposes of the disclosure which do not constitute departures from the spirit and scope of the invention.

What is claimed is:

1. A tapered roller bearing comprising a cup having an inwardly presented tapered raceway, a cone having an outwardly presented tapered raceway and a thrust rib at the large diameter end of he cone raceway, a plurality of tapered rollers fitted between and engaging the raceways of the cup and cone whereby the rollers will roll along the raceways during relative rotation between cup and cone, the rollers at their large diameter ends having end faces which bear against the thrust rib, and distribution means for directing a fluent lubricating medium toward the surface on the thrust rib against which the roller end faces bear so as to reduce the friction between the thrust rib and rollers, the distribution means rotating as the cup and cone rotate relative to each other and the lubricating medium being propelled toward the thrust rib by the centrifugal forces generated through the rotation of the distribution means.

2. A bearing according to claim 1 wherein the distribution means includes a trough located axially beyond the rollers and having an open side presented toward the axis of rotation, and distribution channels leading from the trough toward the thrust rib.

3. A bearing according to claim 2 wherein the trough has an outwardly presented closed side; wherein the channels communicate with the interior of the trough near its closed side; and wherein the channels extend between adjacent rollers.

4. A bearing according to claim 1 and further characterized by a cage through which the rollers project, whereby the cage rotates relative to the cone and cup as the rollers roll along the raceways; and wherein the distribution means is mounted on the cage.

5. A bearing according to claim 4 wherein the distribution means comprises an annular collector trough having an open side presented inwardly toward the axis of rotation and a closed side presented outwardly, and distribution channels communicating with the interior of the trough and extending toward the thrust rib whereby when the fluent lubricating medium is introduced into the open side of the collector trough it will flow toward the closed side of the trough and into the distribution channels due to the centrifugal forces generated by rotation of the trough with the cage.

6. A bearing according to claim 5 wherein the terminal ends of the distribution channels are directed toward the thrust rib and are located further from the axis of rotation than the open side of the trough.

7. A bearing according to claim 6 wherein the distribution channels extend between adjacent rollers.

8. A bearing according to claim 6 wherein the cage comprises a small diameter band located outwardly from the small diameter end of the cone and extending across the small diameter end faces of the rollers, a large diameter band located outwardly from the large diameter end of the cone and extending across the large diameter end end faces of the rollers, and bridges connecting the large and small diameter bands, the bridges extending between the rollers for maintaining the proper circumferential spacing between the rollers; wherein the collector trough is mounted on the small diameter band; and wherein the distribution channels are presented radially inwardly from at least several of the bridges.

9. A bearing according to claim 8 wherein the distribution channels are tubes which are attached to the bridges; and wherein the terminal ends of the tubes turn inwardly away from the bridges and are directed generally toward the face of the thrust rib against which the large diameter ends of the rollers bear.

10. A bearing according to claim 8 wherein the small diameter band is provided with an inwardly turned flange which forms a side of the collector trough, and wherein the distribution channels are tubes which fit into the flange.

11. A bearing according to claim 10 wherein the tubes are anchored in and cantilevered from the flange.

12. A bearing according to claim 6 wherein the cage has an outer surface presented inwardly from the cup raceway, an inner surface presented outwardly from the cone raceway, and tapered pockets which receive the tapered rollers and open outwardly through the inner and outer surfaces so that rollers can engage the cone and cup raceways; wherein the collector trough is on the end of the cage at which the small diameter ends of the rollers are disposed, and wherein the distribution channels extend through the cage between the pockets.

13. A bearing according to claim 12 wherein the pockets open axially outwardly of the cage at their large diameter ends, and wherein a retainer ring is secured to the cage and extends across the axially outwardly opening ends of the pockets for retaining the rollers in the pockets and the cage about the rollers.

14. A bearing according to claim 13 wherein the rollers have axial bores extending completely through them; and wherein the cage has ports which extend from the trough and open into the bores, whereby some of the lubricating medium passes through the rollers and dissipates heat therefrom.

15. A bearing according to claim 6 wherein the rollers have axial bore extending completely through them, and wherein the cage has ports which extend from the trough and open into the bores, whereby some of the lubricating medium passes through the rollers and dissipates heat therefrom.

16. A bearing according to claim 5 and further characterized by a stationary supply ring positioned adjacent the end of the cone along which the small diameter ends of the rollers roll, the supply ring having an outwardly opening groove which aligns with and opens toward the collector trough on the cage, and at least one supply tube connected with the supply ring and discharging into the groove thereof for supplying the lubricant to the groove.

17. A bearing comprising an inner member provided with a raceway, an outer member provided with a raceway located opposite to the raceway on the inner member, a plurality of rolling elements fitted between and engaged with the raceways whereby the rolling elements will roll along the raceway as the members rotate relative to each other, a rib on at least one of the members, the rib being engaged by the end faces of the rolling elements for positioning the rolling elements, a cage fitted around the rolling elements for maintaining the correct spacing between the elements, a collector trough carried by the cage, the trough having an open side presented toward the axis of rotation so that a fluent lubricating medium can be introduced into the trough, and distribution channels leading from the trough toward the rib, the terminal ends of the channels being directed generally toward the face of the rib against which the rolling elements bear and being located further from the axis of rotation than the open end of the trough whereby the lubricating medium will flow through the channels under the influence of the centrifugal forces imparted thereto.

* * * * *

UNITED STATES PATENT OFFICE
CERTIFICATE OF CORRECTION

Patent No. 3,628,835          Dated December 21, 1971

Inventor(s) Robert Franklin Cornish and Robert Lee Leibensperger

It is certified that error appears in the above-identified patent and that said Letters Patent are hereby corrected as shown below:

Assignment of the Patent should be noted as follows:

Assigned to The Timken Company, Canton, Ohio

Col. 2, line 26, after "receives" and before "shaft", - cancel "he" and substitute "the"

Col. 3, line 4, at the beginning of the line, cancel "he" and substitute -- "the".

Col. 4, line 16, at the beginning of the line, cancel "he" and substitute -- "the".

Col. 5, line 26, after "end" and before "118", cancel "all" and substitute -- "wall".

Col. 6, line 73, after "supply" and before "for" cancel "tubes 184" and substitute -- "tubes 186".

Col. 7, line 17, after "of" and before "cone", "he" should read -- "the".

Signed and sealed this 15th day of August 1972.

(SEAL)
Attest:

EDWARD M. FLETCHER, JR.      ROBERT GOTTSCHALK
Attesting Officer             Commissioner of Patents